(12) United States Patent
Saito et al.

(10) Patent No.: US 11,418,662 B2
(45) Date of Patent: Aug. 16, 2022

(54) RECORDING APPARATUS AND IMAGE READING APPARATUS

(71) Applicant: SEIKO EPSON CORPORATION, Tokyo (JP)

(72) Inventors: Kazuo Saito, Shiojiri (JP); Satoshi Yoshino, Matsumoto (JP); Takuro Furusawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/445,119

(22) Filed: Aug. 16, 2021

(65) Prior Publication Data
US 2022/0053097 A1 Feb. 17, 2022

(30) Foreign Application Priority Data
Aug. 17, 2020 (JP) .............................. JP2020-137320

(51) Int. Cl.
*G06F 3/12* (2006.01)
*H04N 1/00* (2006.01)

(52) U.S. Cl.
CPC ....... *H04N 1/0049* (2013.01); *H04N 1/00082* (2013.01); *H04N 1/00408* (2013.01); *H04N 1/00631* (2013.01); *H04N 1/00649* (2013.01)

(58) Field of Classification Search
CPC ............ H04N 1/0049; H04N 1/00082; H04N 1/00408; H04N 1/00631; H04N 1/00649
See application file for complete search history.

(56) References Cited

U.S. PATENT DOCUMENTS

| | | | |
|---|---|---|---|
| 2011/0242249 A1* | 10/2011 | Yazawa | B41J 29/13 347/108 |
| 2013/0242356 A1* | 9/2013 | Oshida | H04N 1/02815 358/474 |
| 2017/0088387 A1* | 3/2017 | Arikawa | B65H 43/08 |
| 2022/0016909 A1 | 1/2022 | Saito et al. | |

FOREIGN PATENT DOCUMENTS

| | | |
|---|---|---|
| JP | 2014-065216 A | 4/2014 |
| JP | 2022-018344 | 1/2022 |

* cited by examiner

*Primary Examiner* — Moustapha Diaby
(74) *Attorney, Agent, or Firm* — Workman Nydegger

(57) ABSTRACT

A recording apparatus includes an apparatus body, a recording section configured to perform recording on a medium, a support tray configured to support the medium on which recording was performed, and a light emitter configured to illuminate a portion of the support tray exposed to the outside of the apparatus body.

6 Claims, 15 Drawing Sheets

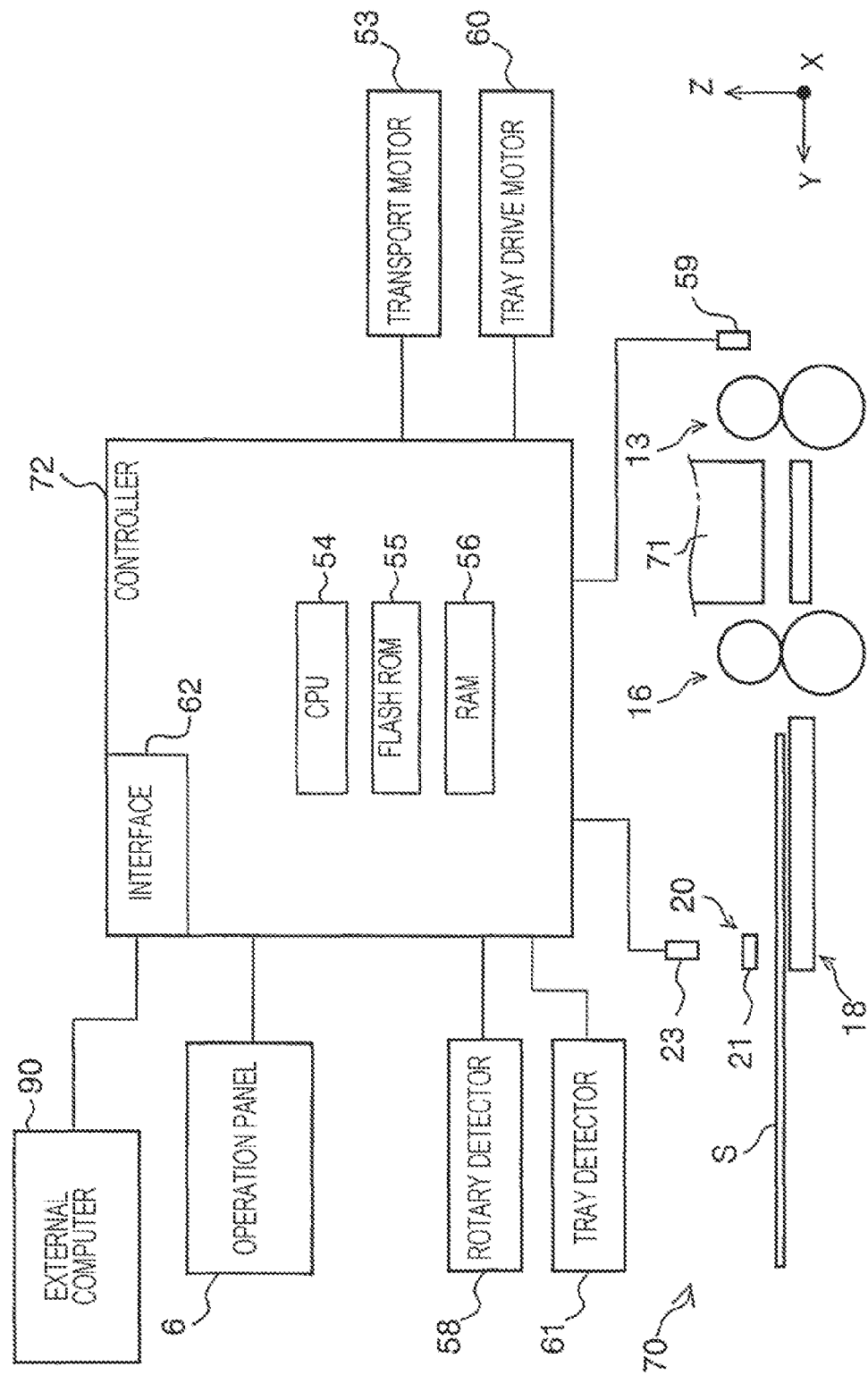

RECORDING APPARATUS AND IMAGE READING APPARATUS

The present application is based on, and claims priority from JP Application Serial Number 2020-137320, filed Aug. 17, 2020, the disclosure of which is hereby incorporated by reference herein in its entirety.

BACKGROUND

1. Technical Field

The present disclosure relates to a recording apparatus for performing recording on a medium. More particularly, the present disclosure relates to an image reading apparatus for reading images on documents.

2. Related Art

Hereinafter, recording apparatuses for performing recording on a medium are described as an example. Some known recording apparatuses record not only on paper, which is a sheet medium, but also on an optical disc, which is a plate-shaped medium, or on other media. JP-A-2014-65216 discloses an example of such reading apparatuses. The recording apparatus described in JP-A-2014-65216 includes a disc tray on which a disc medium is set. The disc tray with a disc medium set thereon is supported by a disc tray base and moved toward a position where recording is performed.

The disc tray base is rotatable, and when a sheet recording material is discharged, the disc tray base is in an accommodation position in which the disc tray base stands vertically, whereas when a disc tray is provided, the disc tray base is in a supply position in which the disc tray base is inclined horizontally. Users learn how to operate the apparatus in advance and switch the position of the disc tray base as necessary.

However, it is difficult for users to know which components of such known recording apparatuses should be operated to record content. In the recording apparatus described in JP-A-2014-65216, for example, to perform recording on a disc medium by using the disc tray, the user must operate the disc tray base first; however, a user unfamiliar with the operation may not know that the component to be operated first is the disc tray base. Accordingly, a structure has been desired that enables a component relating to the operation to be readily noticeable by a user.

SUMMARY

A recording apparatus according to an aspect of the present disclosure to solve the above-described problem includes an apparatus body, a recording section configured to perform recording on a medium, a support tray configured to support the medium on which recording was performedt, and a light emitter configured to illuminate a portion of the support tray exposed to the outside of the apparatus body.

BRIEF DESCRIPTION OF THE DRAWINGS

FIG. 15 is a block diagram illustrating a system for controlling a scanner.

DESCRIPTION OF EXEMPLARY EMBODIMENTS

Figure 1:
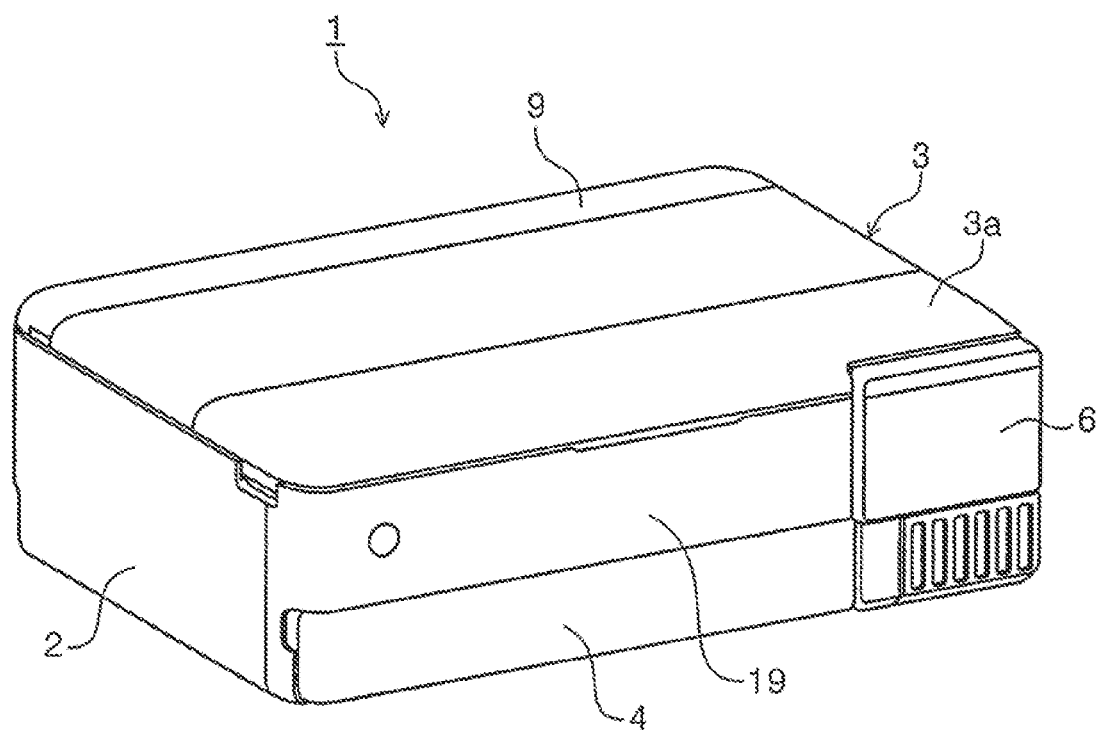
FIG. 1 is a perspective view of a printer with a support tray in a first position.

Hereinafter, an overview of the present disclosure will be described. A recording apparatus according to a first aspect includes an apparatus body, a recording section configured to perform recording on a medium, a support tray configured to support the medium on which recording was performed, and a light emitter configured to illuminate a portion of the support tray exposed to the outside of the apparatus body.

According to the first aspect, a recording apparatus includes a light emitter configured to illuminate a portion of the support tray exposed to the outside of the apparatus body, enabling the user to notice the portion relating to the operation by illuminating the portion of the support tray externally visible to the user. Accordingly, the user can readily notice the portion relating to the operation.

According to a second aspect, in the first aspect, a controller configured to control the light emitter may be provided. In response to switching to a standby mode to wait for a user operation, the controller causes the light emitter to emit light. According to the aspect, a controller configured to control the light emitter is provided and the controller causes the light emitter to emit light in response to switching to a standby mode to wait for a user operation. This structure enables the user to notice that an operation is to be performed immediately, thereby enabling the user to smoothly perform a necessary operation.

According a third aspect, in the second aspect, in response to the controller receiving an instruction to execute recording on the medium, switching to the standby mode may be performed and the light emitter emits light. According to the aspect, in response to the controller receiving an instruction to execute recording on the medium, switching to the standby mode is performed and the light emitter is caused to emit light, enabling the user to notice the portion relating the operation for recording on the medium and thus recording on the medium can be smoothly started.

According to a fourth aspect, in the third aspect, the recording apparatus may include a display section configured to display information, and in response to switching to the standby mode, the controller may cause the display section to display a message prompting a user to set the medium on the support tray.

According to the aspect, in response to switching to the standby mode, the controller causes the display section to display a message prompting the user to set a medium on the support tray. The light emission of the light emitter and the display of the message on the display section enable the user to further readily notice the operation to be performed.

According to a fifth aspect, in the third or fourth aspect, by receiving power from a power supply, the support tray is configured to change the position between a first position in which the support tray is accommodated in the apparatus body and a second position in which the support tray is advanced from the apparatus body. In the first position, an end of a support surface of the support tray for supporting the medium is outside an illumination area of the light emitter, and in response to switching to the standby mode, the controller causes the support tray to change the position to a position in which the end of the support surface is within the illumination area.

In a state in which the support tray is in an accommodated state, that is, in the first position, an end of a support surface of the support tray for supporting the medium is outside the illumination area of the light emitter, and in response to switching to the standby mode, the controller changes the position of the support tray to a position in which the end of the second support surface is within the illumination area. By the operation, the support tray is illuminated appropriately, enabling the user to specifically notice the portion relating to the operation.

According to a sixth aspect, in the fifth aspect, in response to starting recording on the medium, the controller may switch the support tray to the first position. In the first position, the support tray is an accommodated state and the support tray rattles less. According to the aspect, the controller switches the support tray to the first position in response to starting recording on the medium, and thus the medium rattles less during the recording, resulting in a good recording.

According to a seventh aspect, in any one of the second to sixth aspects, the support tray may support the medium via a medium support tray for supporting the medium. According to the aspect, the support tray supports the medium via a medium support tray for supporting the medium, enabling a small medium or a medium that has a shape other than rectangular to be appropriately transported.

According to an eighth aspect, in any one of the second to seventh aspects, in response to completing recording on the medium, the controller may switch off the light emitter. According to the aspect, the controller switches off the light emitter in response to completing recording on the medium, enabling the user to notice that the recording is finished.

According to a ninth aspect, an image reading apparatus includes an apparatus body, a reading section configured to read a document, a support tray configured to support the document on which reading was performed, and a light emitter configured to illuminate a portion of the support tray exposed to the outside of the apparatus body. According to the aspect, an image reading apparatus includes a light emitter configured to illuminate a portion of the support tray exposed to the outside of the apparatus body, enabling the user to notice a portion relating to the operation by illuminating the portion of the support tray externally visible to the user. Accordingly, the user can readily notice the portion relating to the operation.

Hereinafter, an embodiment of the present disclosure will be described. In the drawings, a direction along an X-axis denotes an apparatus width direction and denotes a direction intersecting a medium transport direction in which a medium is transported, that is, a width direction. A negative X direction denotes a right direction and a positive X direction denotes a left direction when viewed from the user facing the apparatus front. A direction along a Y-axis denotes an apparatus depth direction. A positive Y direction denotes a direction from the apparatus rear toward the apparatus front, and a negative Y direction denotes a direction from the apparatus front toward the apparatus rear. The positive Y direction corresponds to a discharge direction in which a recorded medium is discharged through a discharge slot 17. In this embodiment, a side on which a front cover 4 is provided among sides of the apparatus is referred to as the apparatus front. A direction along a Z-axis denotes a vertical direction. A positive Z direction denotes vertically upward, and a negative Z direction denotes vertically downward. In the description below, a direction in which a medium is transported may be referred to as "downstream" and the opposite direction may be referred to as "upstream". Examples of a medium according to the embodiment include paper sheets and plate-shaped optical discs.

Figure 2:
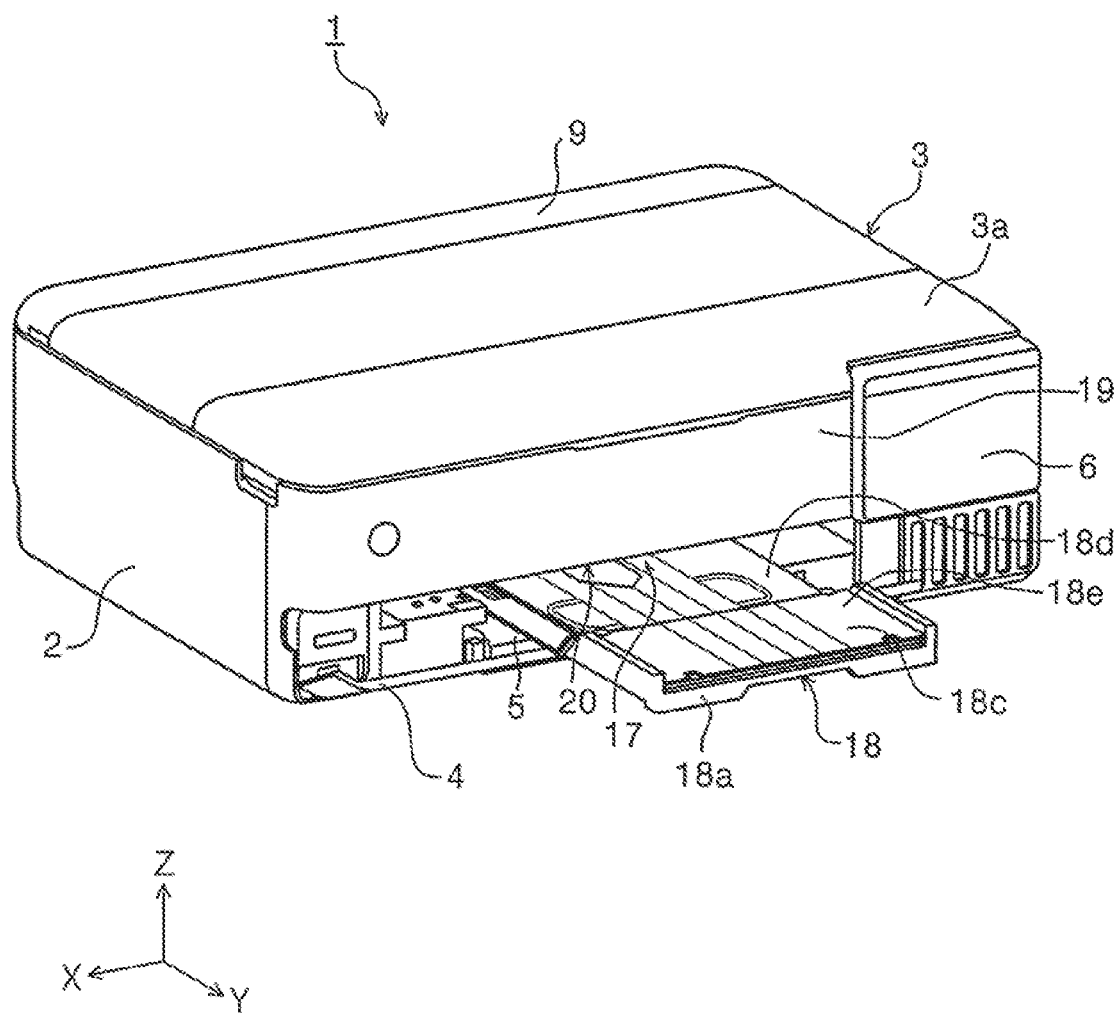
FIG. 2 is a perspective view of the printer with the support tray in a third position.
Figure 3:
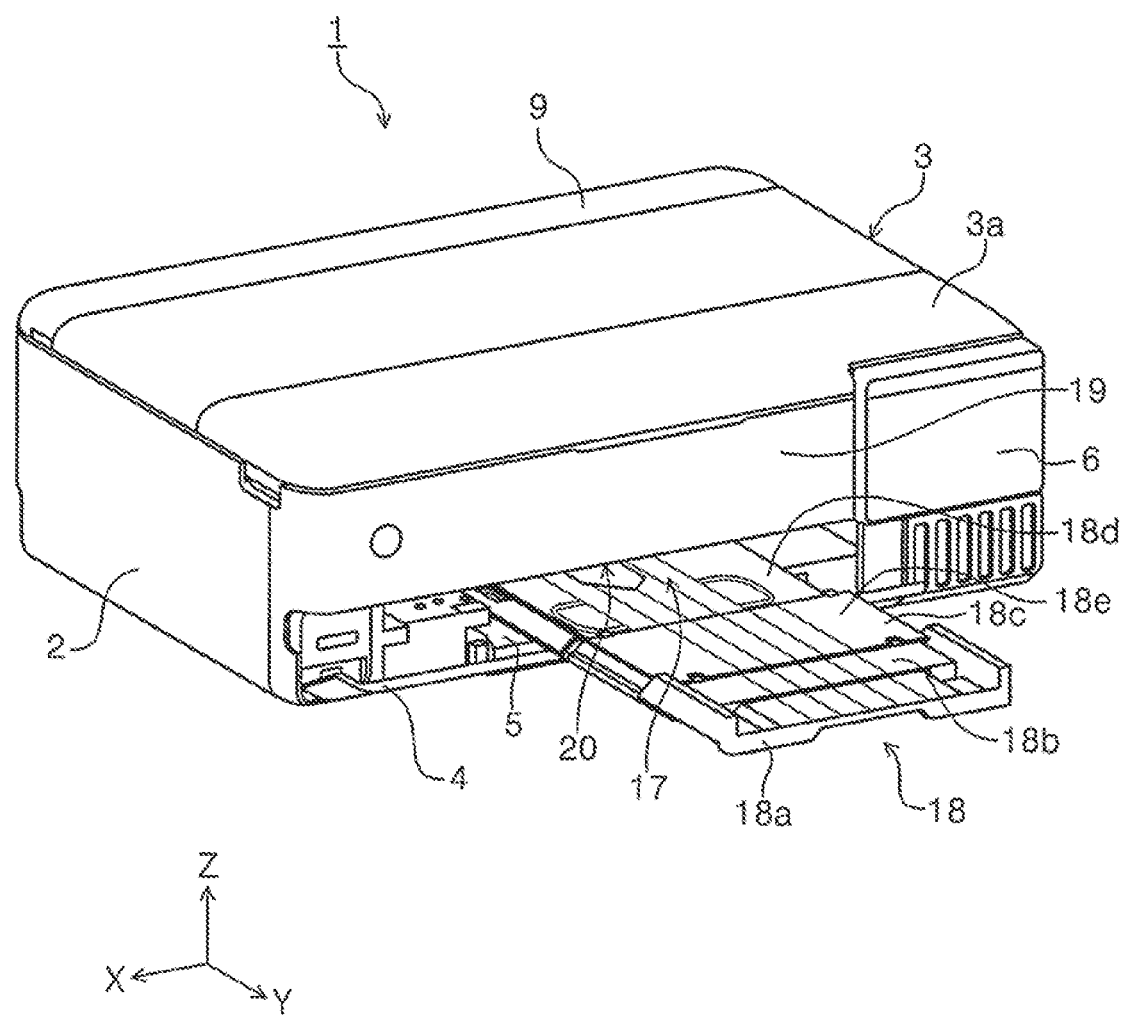
FIG. 3 is a perspective view of the printer with the support tray in a second position.

In FIG. 1 to FIG. 3, an ink jet printer 1, which is an example of a recording apparatus, is a multifunction peripheral that includes a scanner section 3 disposed on an apparatus body 2. In the description below, the ink jet printer 1 is simply referred to as "printer 1". The scanner section 3 is rotatable with respect to the apparatus body 2 to a closed position as illustrated in FIG. 1 or to an open position (not illustrated). The scanner section 3 includes, on a document positioning plate 3*b* (see FIG. 4), a document cover 3*a* that may be opened or closed.

A top cover 9 is disposed on the apparatus body 2 on the rear with respect to the document cover 3*a*. When the top cover 9 is opened, paper sheets can be set on a rear tray 7 (see FIG. 4). The apparatus body 2 includes an operation panel 6 on the front, which is one of the sides of the apparatus, for users to perform various operations or adjust settings. The operation panel 6 according to the embodiment is a touch panel. The operation panel 6 is tiltable by pivoting about a shaft (not illustrated).

The front cover 4 is disposed in a lower portion of the front of the apparatus body 2. The front cover 4 is rotatable about a rotating shaft 4*a* (see FIG. 9) with respect to a sheet feed tray 5 disposed in a lower portion of the apparatus body 2. The front cover 4 can be rotated to a closed position as illustrated in FIG. 1 or to an open position as illustrated in FIG. 2 and FIG. 3. Opening the front cover 4 exposes the discharge slot 17, through which recorded sheets are discharged, and also exposes a support tray 18. The support tray 18 receives discharged paper sheets on which recording has been performed. The support tray 18 supports a disc tray 40 (see FIG. 5) that supports an optical disc R (see FIG. 5) when the disc tray 40 is retracted into the apparatus and when the disc tray 40 is ejected from the apparatus.

The position of the support tray 18 can be changed between a first position (see FIG. 1 and FIG. 9) in which the support tray 18 is accommodated in the apparatus body 2 and a second position in which the support tray 18 is advanced maximally in the positive Y direction as illustrated in FIG. 3. The position of the support tray 18 in FIG. 2 is a third position between the first position and the second position. The support tray 18 may be positioned in a fourth position (see FIG. 10 and FIG. 11) in which the support tray 18 is advanced slightly from the first position. The position of the support tray 18 is switched by the power transmitted by a tray driving motor 60 (see FIG. 5) to the support tray 18 via a rack-and-pinion mechanism (not illustrated). A controller 50 (see FIG. 5) determines, based on recording information, the position to which the support tray 18 is to be switched.

In this embodiment, when the support tray 18 is in the third position illustrated in FIG. 2, the support tray 18 can receive, for example, an A4-size paper sheet discharged with a long side of the paper sheet along the Y-axis. When the support tray 18 is in the second position illustrated in FIG. 3, the support tray 18 can receive, for example, an A3-size paper sheet discharged with a long side of the paper sheet along the Y-axis. The support tray 18 can be switched by the power of the tray driving motor 60 (see FIG. 5) from not only the first position to the second position but also from the second position to the first position.

The support tray 18 according to the embodiment includes a first tray 18c, a second tray 18b, and a third tray 18a as illustrated in FIG. 3. The first tray 18c, the second tray 18b, and the third tray 18a of the support tray 18 are moved in conjunction with each other in the positive Y direction when the support tray 18 is switched from the accommodated state in FIG. 1 and FIG. 9, that is, the first position to the third position in FIG. 2. When the support tray 18 is switched from the third position in FIG. 2 to the second position in FIG. 3, the second tray 18b and the third tray 18a are moved in the positive Y direction with respect to the first tray 18c. In a state in which the support tray 18 is switched to the second position, the second tray 18b is positioned further than the first tray 18c in the positive Y direction and the third tray 18a is positioned further than the second tray 18b in the positive Y direction as illustrated in FIG. 3.

The top of the first tray 18c has a first support surface 18d and a second support surface 18e that is positioned in the positive Y direction with respect to the first support surface 18d as illustrated in FIG. 2 and FIG. 3. The second support surface 18e is positioned further than the first support surface 18d in the positive Z direction, that is, the second support surface 18e is one tier higher than the first support surface 18d.

Although the support tray 18 according to the embodiment is a multi-stage support tray as described above, the support tray 18 may be a single tray. In such a case, a rack may be disposed on the tray in the Y-axis direction and a pinion gear that meshes with the rack may be disposed to provide a rack-and-pinion mechanism to enable the tray to be moved in the Y-axis direction by the power of a motor. Such a mechanism enables the support tray 18 to be changed between the first position in which the support tray 18 is accommodated in the apparatus body 2 and the second position in which the support tray 18 is advanced maximally from the apparatus body 2 in the positive Y direction further than the first position.

Figure 4:
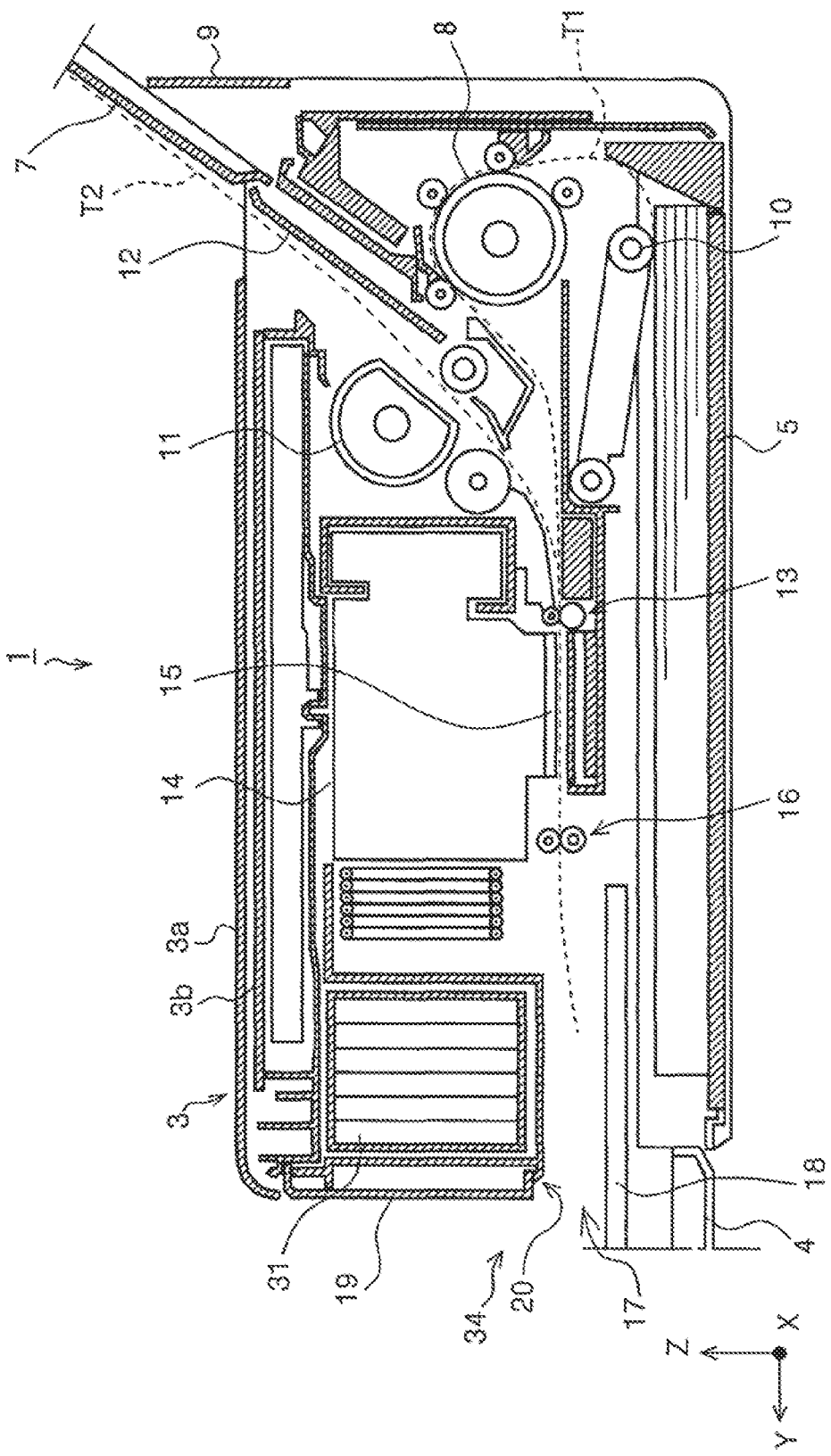
FIG. 4 illustrates a medium transport path in the printer.

Next, a medium transport path in the printer 1 is described with reference to FIG. 4. Paper sheets that are stored in the sheet feed tray 5 disposed in the lower portion of the apparatus body 2 are fed in the negative Y direction by a feed roller 10 driven by a feed motor 52 (see FIG. 5). Reference T1 denotes a path along which paper sheets fed from the sheet feed tray 5 are transported. The paper sheets set on the rear tray 7 come into contact with a feed roller 11 as a hopper 12 moves upward, and the paper sheets are fed downstream by the rotation of the feed roller 11 driven by the feed motor 52 (see FIG. 5). Reference T2 denotes a path along which paper sheets fed from the rear tray 7 are transported.

A reverse roller 8 driven by the feed motor 52 (see FIG. 5) is disposed above the feed roller 10. A paper sheet fed from the sheet feed tray 5 receives a feeding force from the reverse roller 8, and the paper sheet is fed toward a transport roller pair 13 disposed in the positive Y direction with respect to the reverse roller 8. The paper sheet fed from the rear tray 7 is transported toward the transport roller pair 13 without passing the reverse roller 8. The paper sheet is transported by the transport roller pair 13 driven by a transport motor 53 (see FIG. 5) toward an area that faces a recording head 15, that is, a recording area.

The recording head 15, which is an example of a recording section, is disposed on a carriage 14. The carriage 14 is powered by a carriage motor 51 (see FIG. 5) to reciprocate in the X-axis direction. The recording head 15 discharges an ink to a paper sheet as the carriage 14 moves. The recorded sheet is discharged by a discharge roller pair 16, which is driven by the transport motor 53 (see FIG. 5), toward the support tray 18. The recording section according to the embodiment is the recording head 15 that moves in the X-axis direction; however, a line head that has ink discharge nozzles that cover the entire sheet width may be used.

A waste ink container 31 is disposed above the support tray 18 on a downstream of the discharge roller pair 16. When the carriage 14 is at a home position, ink discharged by the recording head 15 in response to a flushing operation for discharging ink to a cap unit (not illustrated) is sent to the waste ink container 31 by a pump mechanism (not illustrated) and stored.

Figure 5:
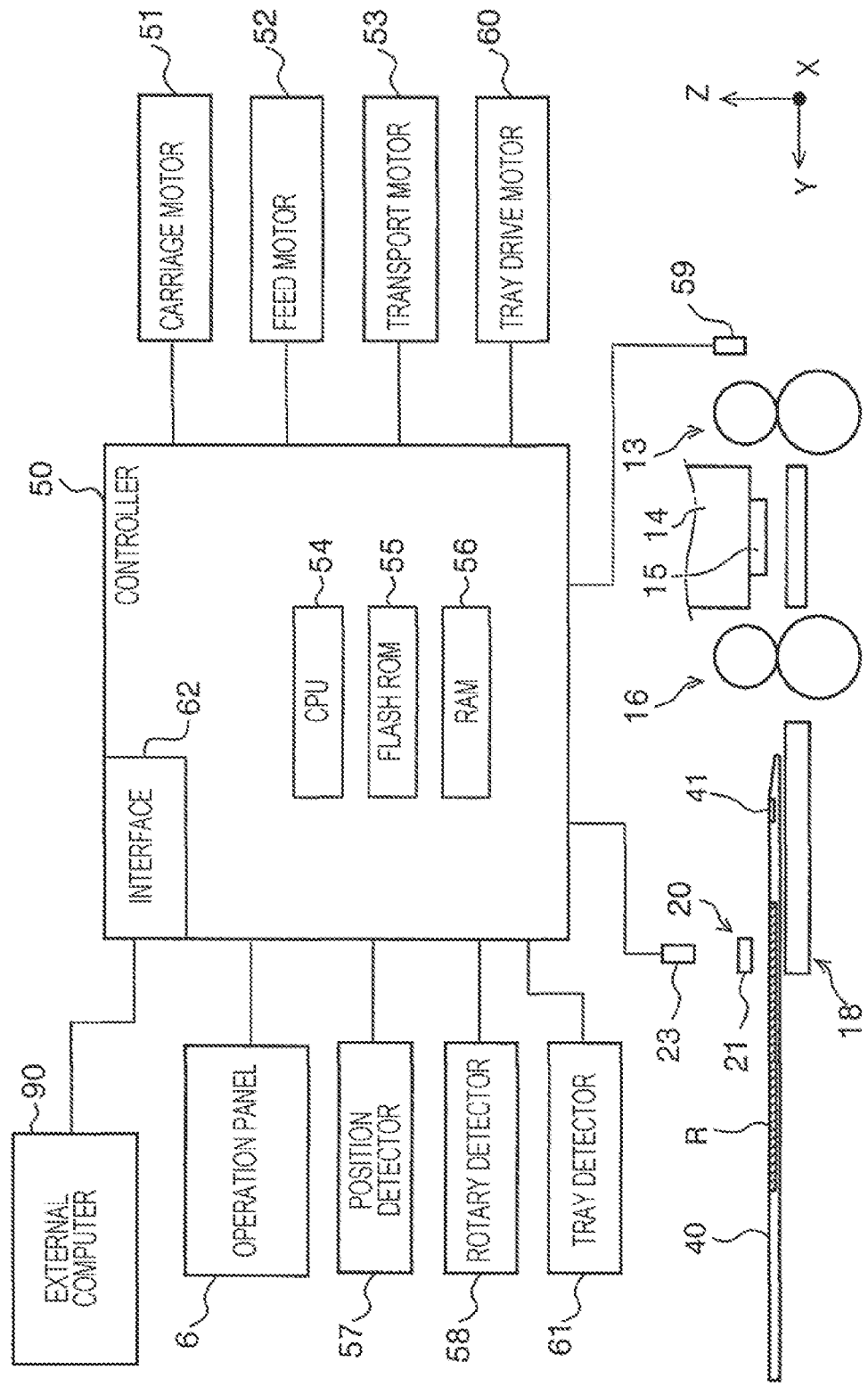
FIG. 5 is a block diagram illustrating a control system of the printer.

The printer 1 according to the embodiment includes the disc tray 40 that serves as a medium support tray on which an optical disc R, which is an example of a medium as illustrated in FIG. 5, can be set. The disc tray 40 can be moved from the apparatus front toward a position at which recording is performed by the recording head 15. The disc tray 40 can be mounted on the support tray 18 when the disc tray 40 is in the fourth position (see FIG. 10, FIG. 11) in which the support tray 18 is advanced slightly from the first position and can be moved toward the position for recording by the recording head 15. This operation is described in detail below. An end of the inserted disc tray 40 in the negative Y direction is nipped by the transport roller pair 13, and a reflector 41 in an end portion of the disc tray 40 in the negative Y direction is detected by a medium detector 59. The disc tray 40 is transported by the transport roller pair 13 in the negative Y direction and then in the positive Y direction, thereby performing recording on a label surface of the optical disc R. It should be noted that a plate-shaped medium may be mounted directly on the support tray 18 without using the disc tray 40 and moved toward the recording position for recording by the recording head 15.

A control system in the printer 1 is described with reference to FIG. 5. The controller 50 performs various control processes in the printer 1 such as feeding, transporting, discharging, and recording of a medium. The controller 50 receives signals from the operation panel 6 and sends signals to the operation panel 6 for display on the operation panel 6, more specifically, signals for displaying a user interface (hereinafter, referred to as "UI").

The controller 50 controls the carriage motor 51, the feed motor 52, the transport motor 53, and the tray drive motor 60. Each of the motors according to the embodiment is a direct current (DC) motor. The controller 50 also receives detection signals from a position detector 57, a rotary detector 58, the medium detector 59, and a tray detector 61. The position detector 57 is a linear encoder that is a detector for detecting a position of the carriage 14 in the X-axis direction. The rotary detector 58 is a rotary encoder that is a detector for detecting an amount of rotation and a rotation speed of the roller driven by the transport motor 53.

The medium detector 59 is disposed on the upstream and in the vicinity of the transport roller pair 13 to detect passage of a leading edge and a trailing edge of a medium. The medium detector 59 is a non-contact optical sensor. The controller 50 determines a position of a medium in accordance with information from the medium detector 59.

The tray detector 61 according to the embodiment is a detector for detecting that the support tray 18 is switched from the first position, that is, an accommodated state, to the third position illustrated in FIG. 2, and the tray detector 61 is, for example, a contact sensor. A detection signal from the tray detector 61 is in an on state when the support tray 18 is in the first position, and the on state continues while the support tray 18 is being moved from the first position toward the third position until the support tray 18 is switched to the third position. The detection signal is switched to an off state when the support tray 18 is switched to the third position. The detection signal from the tray detector 61 is maintained in the off state when the support tray 18 is between the third position and the second position illustrated in FIG. 3. The detection signal from the tray detector 61 is switched from an off state to an on state when the support tray 18 is switched to the third position when the support tray 18 is moved from the second position toward the first position, and the on state is maintained. The controller 50 detects a direction in which the tray drive motor 60 is driven and an increase in the driving current value to detect switching of the support tray 18 to the first position while the support tray 18 is moved toward the first position and to detect switching of the support tray 18 to the second position while the support tray 18 is moved toward the second position. It should be noted that a sensor that detects that the support tray 18 is in the first position and/or a sensor that detects that the support tray 18 is in the second position may be additionally provided. The tray drive motor 60 is provided with a rotary encoder (not illustrated). The controller 50 determines a rotation direction and an amount of rotation of the tray drive motor 60 in accordance with a signal output from the rotary encoder.

The controller 50 includes a central processing unit (CPU) 54, a flash read-only memory (ROM) 55, and a random access memory (RAM) 56. The CPU 54 performs various arithmetic processing in accordance with a program stored in the flash ROM 55 and performs overall operational control on the printer 1. A program for controlling the support tray 18 and light emitters 23, which will be described below, is also stored in the flash ROM 55. The flash ROM 55 is a readable and writable nonvolatile memory. Various kinds of setting information input by the user via the operation panel 6 is also stored in the flash ROM 55. The RAM 56, which is an example of a storage device, temporarily stores various kinds of information. The controller 50 includes an interface 62 and is capable of communicating with an external computer 90 via the interface 62.

Next, the discharge slot 17 is described in detail. The discharge slot 17 corresponds to a discharge position at which a paper sheet on which recording has been performed by the recording head 15 is discharged in the Y-axis direction. An upper end of the discharge slot 17 is a facing portion 20 that faces the support tray 18 and a recording surface of a recorded medium as illustrated in FIG. 2 and FIG. 3.

Figure 6:
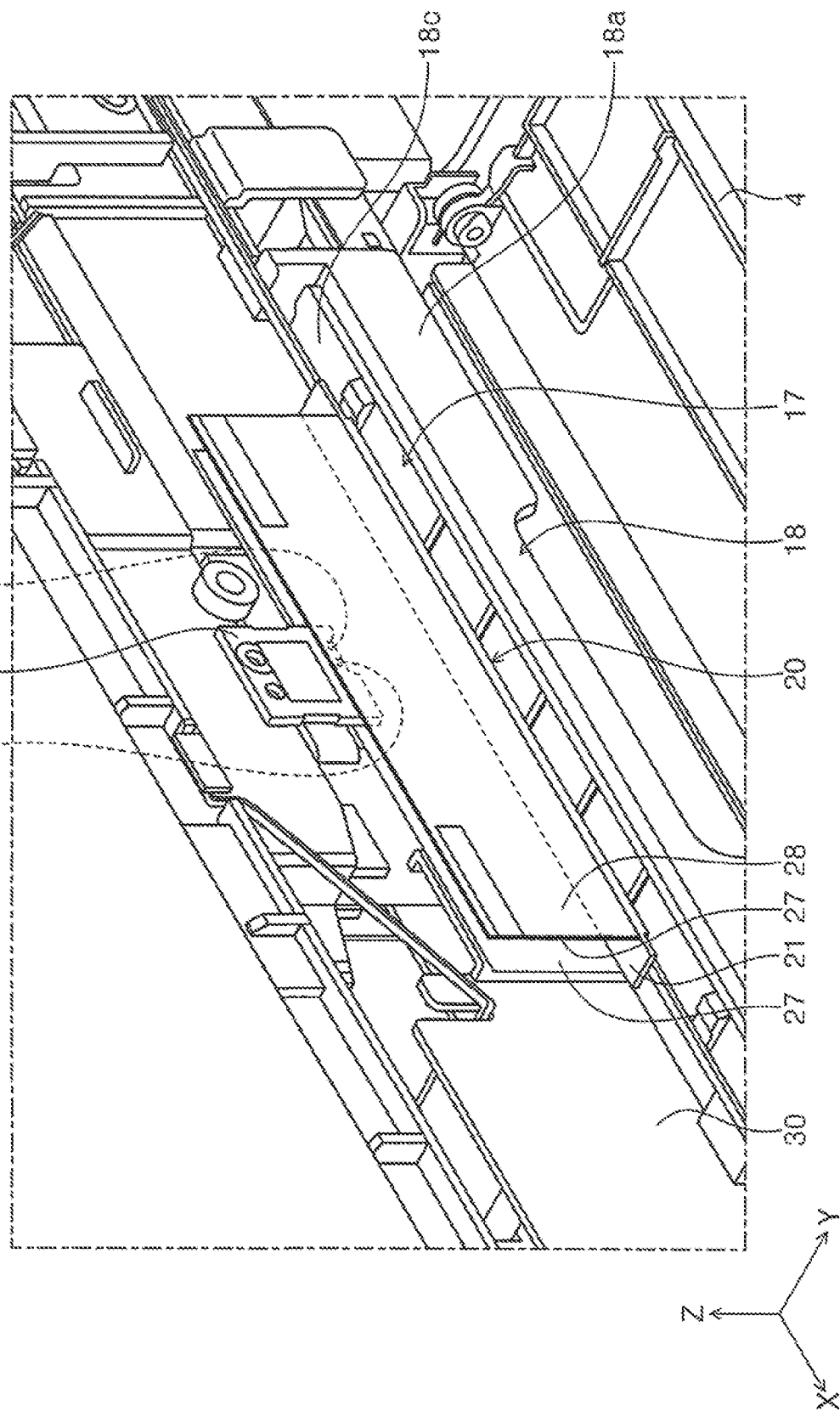
FIG. 6 is a partial enlarged perspective view of the front of the printer in which a front cover is removed to expose a substrate.
Figure 7:
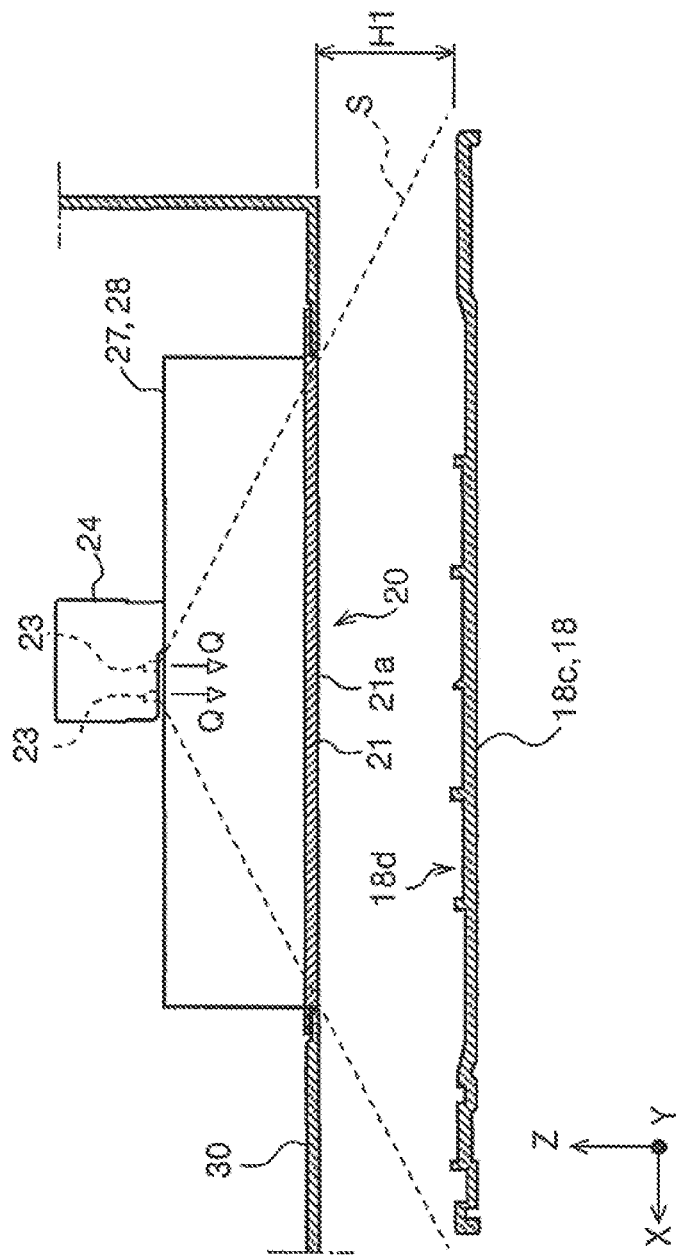
FIG. 7 illustrates an area illuminated by light emitters viewed in a medium discharging direction.
Figure 8:
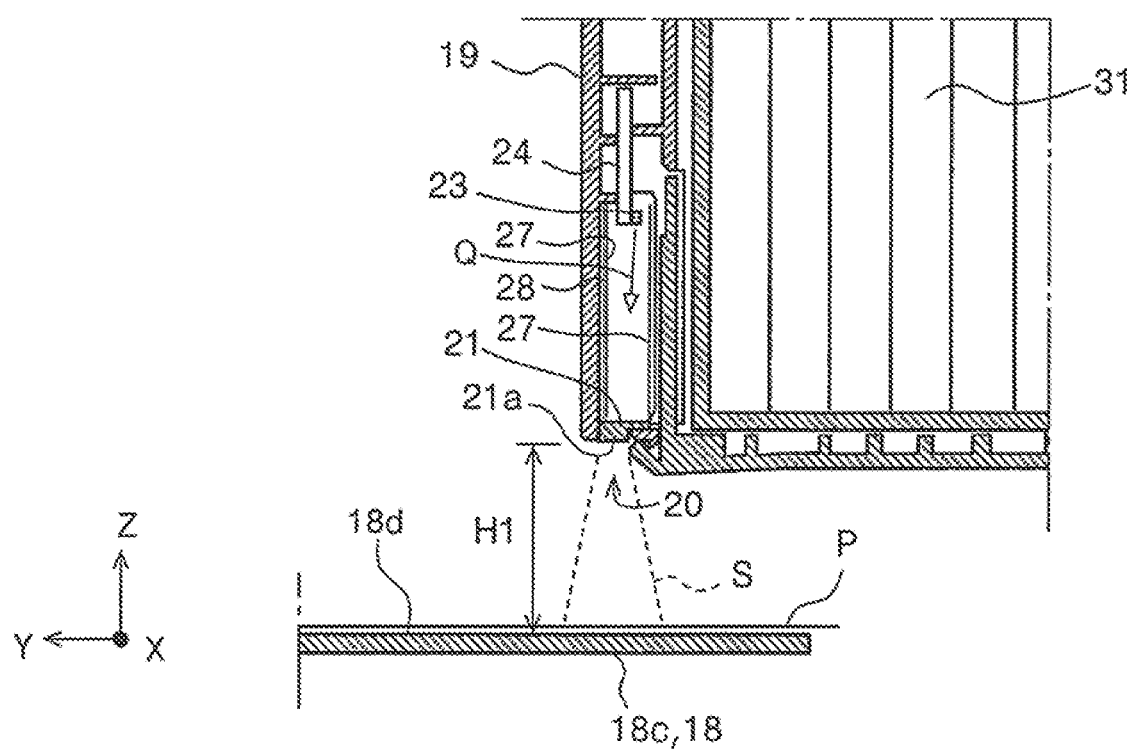
FIG. 8 illustrates an area illuminated by the light emitters viewed in a medium width direction.

The facing portion 20 includes an optical member 21 as illustrated in FIG. 6 to FIG. 8. The optical member 21 is attached to a frame 30 so as to be in a central portion of an area where a medium passes in the X-axis direction, that is, in the medium width direction. More specifically, a central position of a discharged medium in the width direction corresponds substantially to a central position of the optical member 21 in the X-axis direction.

The optical member 21 is made of an optically transparent material and functions as a lens. The optical member 21 according to the embodiment is made of a colorless transparent resin material and has a surface 21a that is a ground-glass surface that faces a recording surface of a medium.

The light emitters 23 are disposed in the positive Z direction with respect to the optical member 21. Each of the light emitters 23 according to the embodiment is a white light-emitting diode (LED). In this embodiment, two light emitters 23 are disposed on a substrate 24 at an interval in the X-axis direction, that is, in the medium width direction. The two light emitters 23 are symmetrical with respect to the central position of the optical member 21 in the X-axis direction, that is, in the medium width direction.

The light emitters 23 emit light to the optical member 21 in a direction indicated by arrow Q in FIG. 7 to FIG. 11. More specifically, the optical member 21 is disposed at a position at which the light emitted from the light emitters 23 is incident. The optical member 21 illuminates the support tray 18 with incident light. The visible light emitted from the optical member 21 to the support tray 18 diverges in the medium width direction as illustrated in FIG. 7 and also in the medium transport direction as illustrated in FIG. 8.

Reflective sheets 27 are disposed on the upstream and the downstream in the medium transport direction with respect to the optical path of the light emitted from the light emitters 23 as illustrated in FIG. 6 and FIG. 8. More specifically, a sheet of a pair of reflective sheets 27 is disposed on either side of the optical path of the light emitted from the light emitters 23. Each of the reflective sheets 27 extends from the position of the light emitter 23 to the top of the optical member 21 in the Z-axis direction. In addition, the reflective sheet 27 substantially covers the entire area of the optical member 21 in the X-axis direction. The reflective sheet 27 may be made of, for example, a white sheet material.

A shading sheet 28 is disposed between the reflective sheet 27 that is closer to a front panel 19 and the front panel 19. In this embodiment, the dimensions of the shading sheet 28 in the X-axis direction and the Z-axis direction are similar to those of the reflective sheet 27. The shading sheet 28 may be made of, for example, a black sheet material.

FIG. 7 to FIG. 11 illustrate an illumination area S that is illuminated with the light emitted from the optical member 21 to a recording surface of a paper sheet P. The light emitted by the light emitters 23 enters the optical member 21, which has the ground-glass surface 21a, diverges in the optical member 21 in the medium width direction, and propagates to a recording surface of a medium. As illustrated in FIG. 7, the width of the illumination area according to the embodiment covers the entirety of the support tray 18 in the second position or the third position. It should be noted that the illumination area of the light from the optical member 21 is not limited to the entirety of the support tray 18 in the medium width direction.

FIG. 7 illustrates the illumination area S when the support tray 18 is in the third position in FIG. 2 or in the second position in FIG. 3 and illustrates a distance H1 between the support tray 18 and the optical member 21 in the Z-axis direction, that is, a direction orthogonal to the recording surface of the paper sheet P. When the support tray 18 is in the second position or the third position, the optical member 21 faces the first support surface 18d of the first tray 18c, and in this position, the distance between the optical member 21 and the support tray 18 is longest. In this state, the width of the illumination area S illustrated in FIG. 7 covers the entirety of the support tray 18 in the medium width direction. In contrast, when the support tray 18 is in the first position in FIG. 9 or in the fourth position in FIG. 11, the optical member 21 faces the second support surface 18e of the first tray 18c, and the distance between the optical member 21 and the support tray 18 is shortest; in this embodiment, the distance H2 is 10 mm or less. In this state, the width of the illumination area S in the medium width direction is narrower than the width of the support tray 18; however, the width may be wider than or equal to the width of the support tray 18.

As described above, the facing section 20 faces a recording surface of a medium at the discharge position of the medium recorded by the recording head 15. The facing section 20 includes the optical member 21, which is disposed at the position at which the light emitted by the light emitters 23 is incident and is disposed to face the recording surface of the medium such that the incident light propagates to at least the recording surface of the medium. Accordingly, the recording result can be checked immediately, that is, before the recording is completed, and also clearly checked visually. As a result, user needs can be appropriately satisfied. In addition, the width of the illumination area illuminated by the optical member 21 covers the entirety of the support tray 18, enabling the user to visually check the recording result more appropriately.

The optical member 21 according to the embodiment has the optically transparent ground-glass surface 21a disposed to face a recording surface of a medium. Accordingly, the optical member 21 can diverge the light emitted by the light emitters 23 over a wider area.

To diverge the light emitted by the light emitters 23 over a wider area, instead of the optical member 21 having the ground-glass surface 21a, or in addition to the optical member 21 having the ground-glass surface 21a, an optical member 21 made of a material that contains a light-diffusing agent and has optical transparency may be used. The light-diffusing agent may be barium sulfate, calcium carbonate, silicon oxide, magnesium carbonate, aluminum hydroxide, titanium oxide, zinc oxide, synthetic silica, or glass beads. It should be noted that the component for diverging the light emitted by the light emitters 23 over a wide area is not limited to the component that has the ground-glass surface 21a and/or the component that contains a light-diffusing agent.

In this embodiment, the distance between the support tray 18 and the optical member 21 in the direction orthogonal to a recording surface of a medium is 30 mm or less, enabling the user to visually check the recording result clearly at the medium discharge position. It should be noted that the distance between a recording surface of a medium and the optical member 21 may be greater than 30 mm when the light quantity at the recording surface is sufficient.

In this embodiment, a sheet of a pair of reflective sheets 27 is disposed on either side of the optical path of the light emitted by the light emitters 23 to the optical member 21. Accordingly, the quantity of light emitted from the optical member 21 to the recording surface of the medium can be ensured. The reflective sheets 27 may be omitted when a sufficient quantity of light can be ensured without the reflective sheets 27.

In this embodiment, the shading sheet 28 is disposed between the reflective sheet 27 that is closer to the front panel 19, which is a wall portion forming the apparatus front, and the front panel 19. Accordingly, leakage of the light from the front panel 19 to the apparatus front can be suppressed. The shading sheet 28 may be omitted when the light shielding effect of the front panel 19 is high and little light leakage is visually observed through the front panel 19 to the outside of the apparatus.

Figure 9:
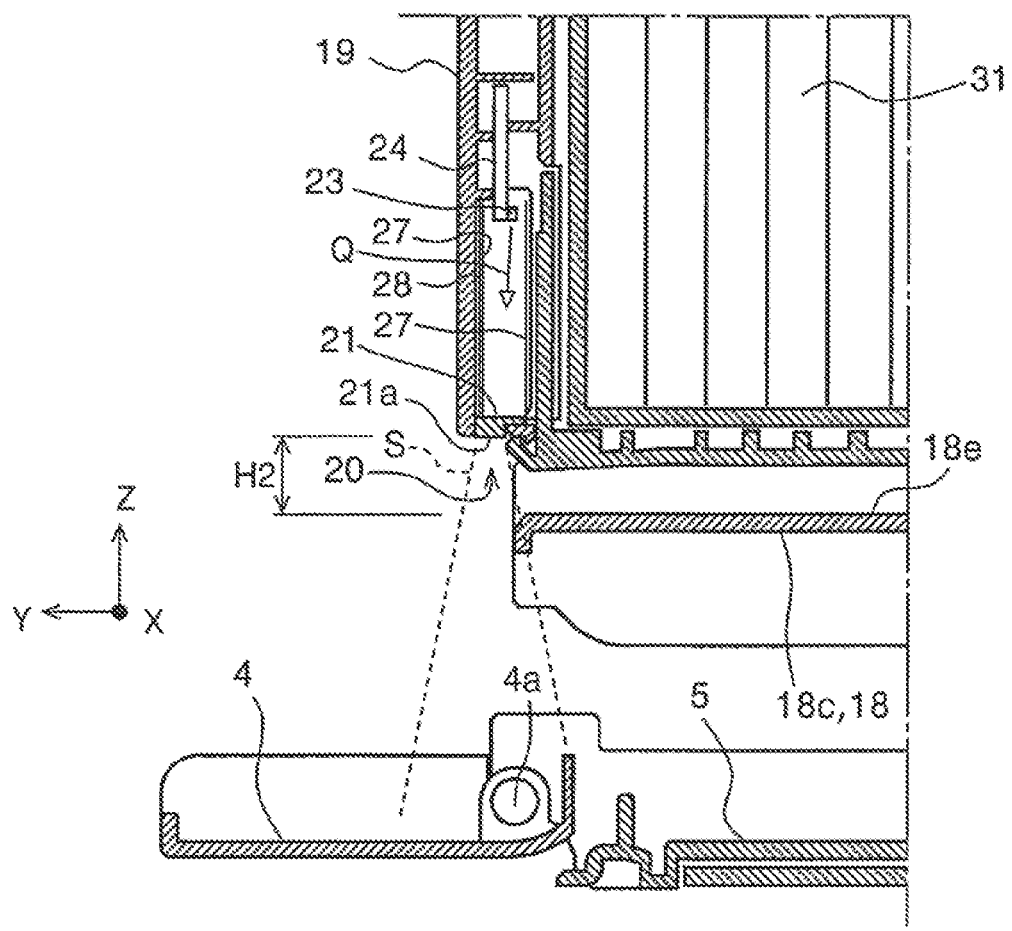
FIG. 9 illustrates an area illuminated by the light emitters with the support tray in an accommodated state viewed in the medium width direction.

Next, control processing performed by the controller 50 for the light emitters 23 (FIG. 5) is described. In FIG. 1, the front panel 19, which is the front, which is one of the sides of the apparatus body 2, is flush with the cover 4 in a closed state. Accordingly, to suppress the front panel 19 in the closed state from interfering with the end of the support tray 18 in the positive Y direction, the end of the support tray 18 in the positive Y direction in the accommodated state, that is, in the first position, is retracted in the negative Y direction, that is, in the apparatus depth direction, compared with the front panel 19 as illustrated in FIG. 9. In this state, the second support surface 18e of the support tray 18 is outside the illumination area S.

The control processes to be performed by the controller 50 when recording is performed on an optical disc R in the above structure will be described with reference to FIG. 12 and FIG. 13. The controller 50 receives recording data, that is, a recording execution instruction (Yes in step S101), and then performs a fine advance operation on the support tray 18 (step S102). The fine advance operation performed on the support tray 18 causes the end of the second support surface 18e of the support tray 18 in the positive Y direction to advance into the illumination area S as illustrated in the change from FIG. 9 to FIG. 10. The controller 50 causes the light emitters 23 to emit light (step S103).

Figure 13:
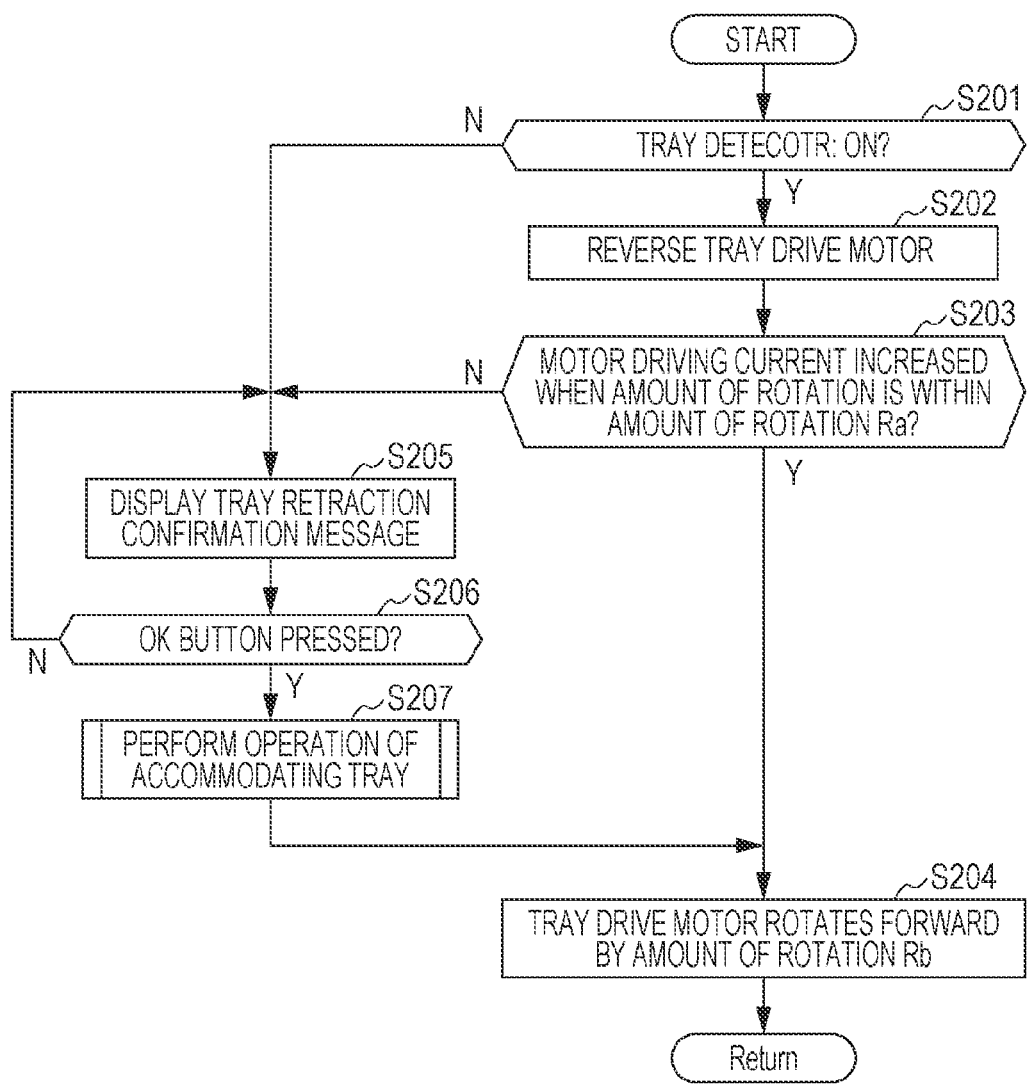
FIG. 13 is a flowchart illustrating processing for fine advance control for the support tray.

FIG. 13 illustrates detailed processing in step S102. The controller 50 determines whether a detection signal from the tray detector 61 is in an on state (step S201). When the detection signal is in an on state, that is, when the support tray 18 is in the first position or in a position closer than the third position to the first position (Yes in step S201), the controller 50 causes the tray drive motor 60 to reverse to change the position of the support tray 18 in the accommodation direction (step S202).

Figure 10:
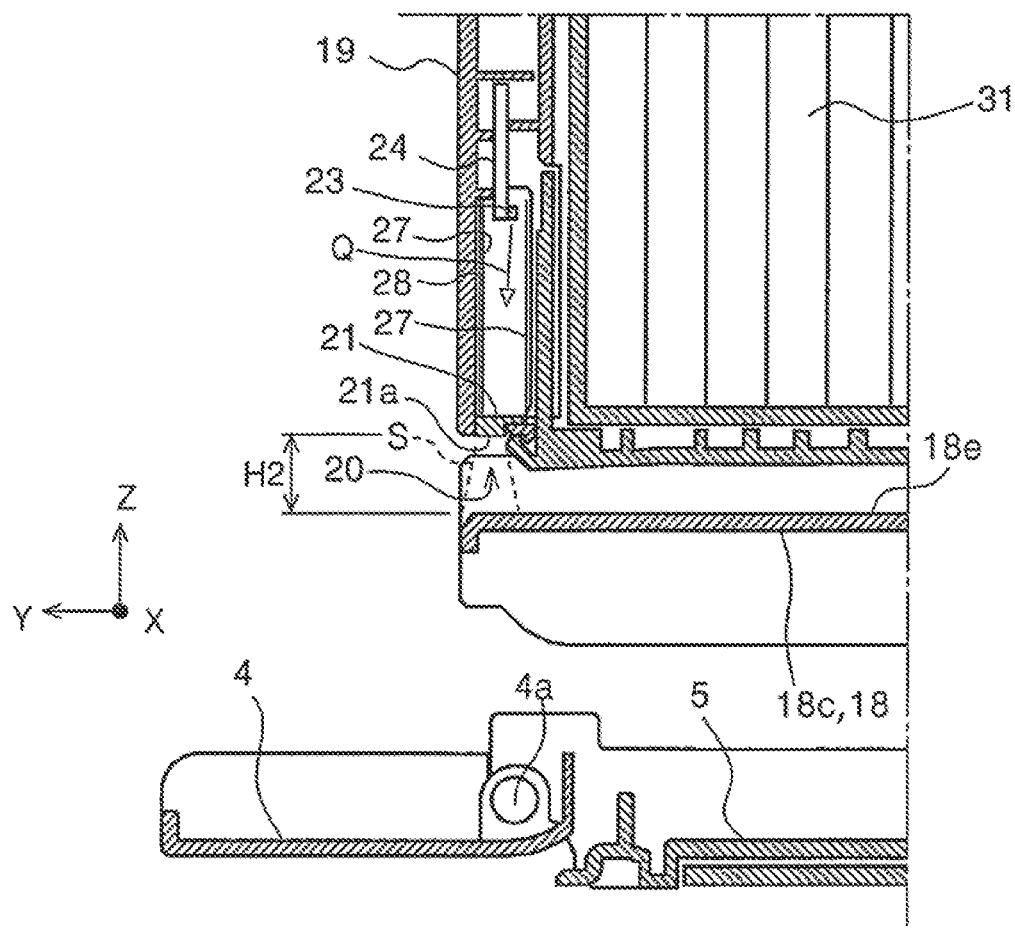
FIG. 10 illustrates an area illuminated by the light emitters with the support tray in a slightly advanced state viewed in the medium width direction.
Figure 11:
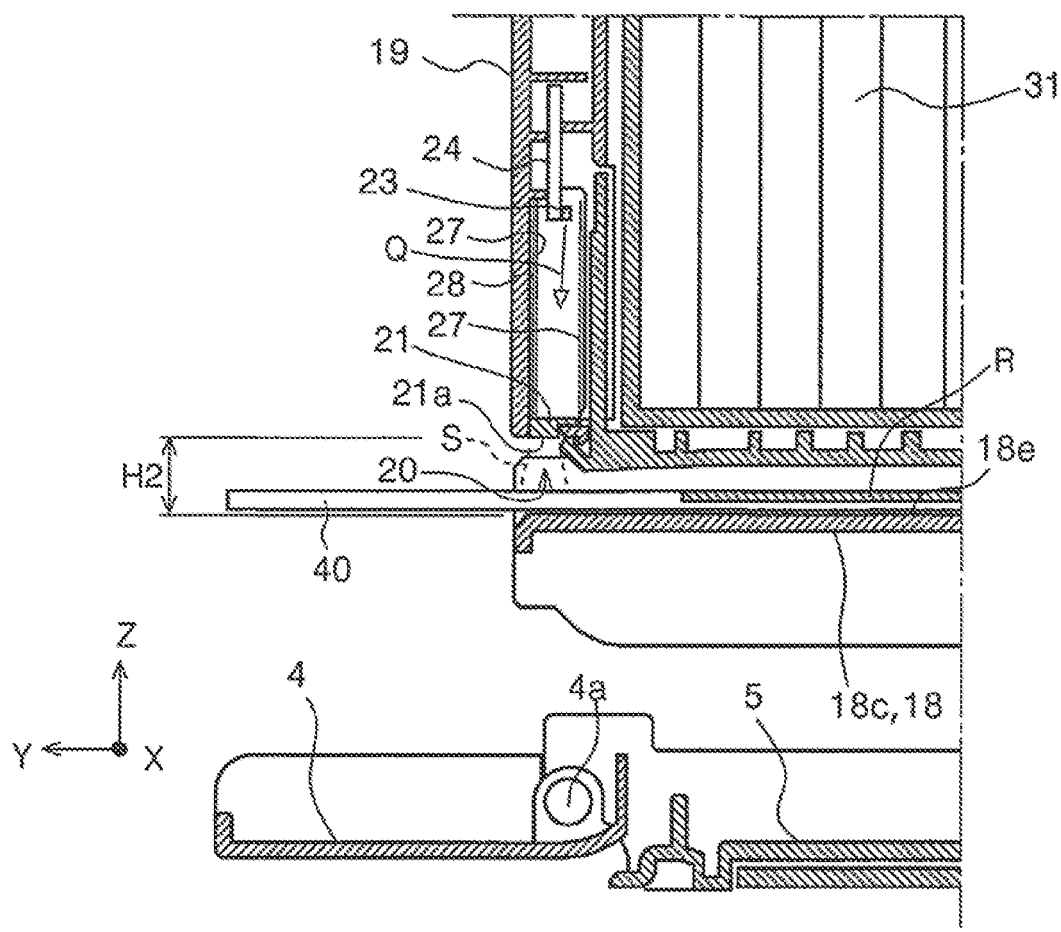
FIG. 11 illustrates an area illuminated by the light emitters with the support tray in the slightly advanced state viewed in the medium width direction.

In this processing, when the support tray 18 is in the first position, the position of the support tray 18 is not changed further in the accommodation direction, and the driving current value of the tray drive motor 60 immediately increases. More specifically, when the driving current value of the tray drive motor 60 increases when the amount of rotation of the tray drive motor 60 is within an amount of rotation Ra, it can be determined that the support tray 18 is in the first position. Accordingly, in such a case (Yes in step S203), the tray drive motor 60 rotates forward by an amount of rotation Rb (step S204). The rotation moves the support tray 18 from the first position illustrated in FIG. 9 to the position illustrated in FIG. 10, that is, to the fourth position. When the support tray 18 is in the fourth position, the end of the second support surface 18e in the positive Y direction is within the illumination area S, and the first support surface 18d is illuminated with the light as illustrated in FIG. 10.

In contrast, when the detection signal from the tray detector 61 is not in the on state in step S201 (No in step S201), it can be determined that the support tray 18 is in the third position, in the second position, or in a position between the third position and the second position. In such a state, a paper sheet may be mounted on the support tray 18; accordingly, a confirmation message such as "RETRACT TRAY?" is displayed on the operation panel 6 (step S205).

When the user presses an OK button (Yes in step S206), an operation for switching the support tray 18 to the first position, that is, the accommodated state, is performed (step S207). After the operation, the tray drive motor 60 rotates forward by the amount of rotation Rb (step S204) to move the support tray 18 from the first position illustrated in FIG. 9 to the position illustrated in FIG. 10, that is, to the fourth position. This operation is the fine advance operation performed on the support tray 18, and the fine advance amount is, for example, 6 to 7 mm.

When No in step S203, the support tray 18 is advanced by a certain amount from the first position in the positive Y direction, and in such a state, a paper sheet may be mounted on the support tray 18 similarly to the above case; accordingly, the processing from step S205 to S207 is performed similarly to the above case, and the processing in step S204 is performed next.

Returning to FIG. 12, after the controller 50 performs the fine advance operation on the support tray 18 (step S102), the controller 50 causes the light emitters 23 to emit light (step S103) and causes the operation panel 6 to display a message prompting the user to set the disc tray 40 (step S104). It should be noted that step S103 and step S104 may be performed simultaneously.

Figure 14:
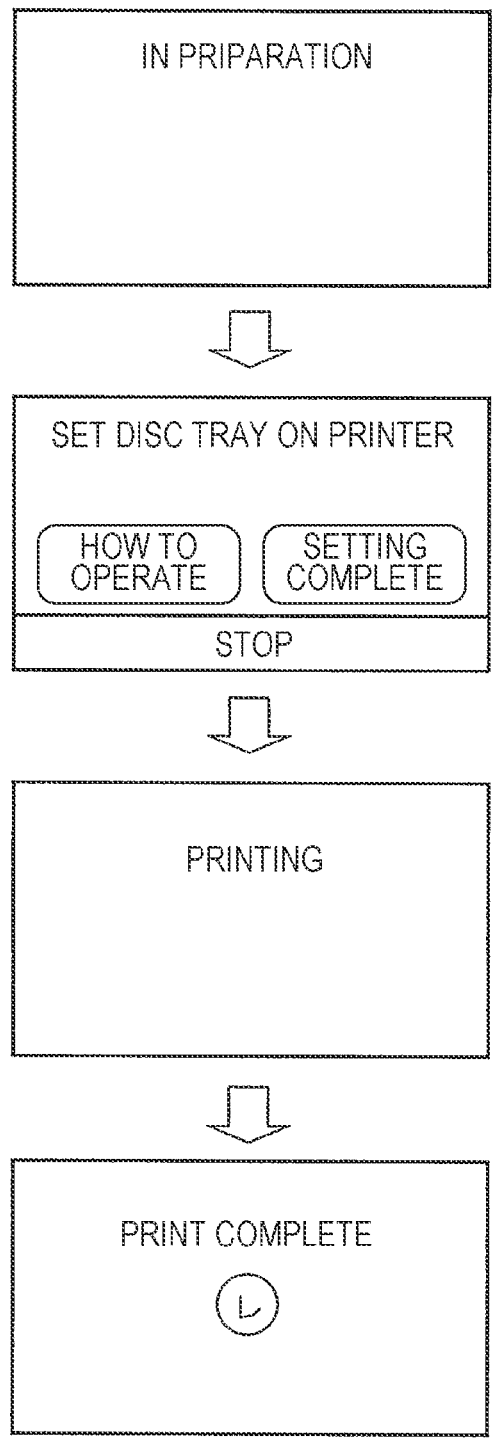
FIG. 14 illustrates changes in display on an operation panel.

The message in step S104 may be, for example, "SET DISC TRAY ON PRINTER", as on the user interface (UI) in the second block from the top in FIG. 14. While the fine advance operation (step S102) is performed on the support tray 18, a notification of, for example, "IN PREPARATION" is displayed on the UI of the operation panel 6 as in the uppermost block in FIG. 14. After the message prompting the user to set the disc tray 40 is displayed on the operation panel 6, the printer 1 enters a standby mode to wait for a user operation.

The user can choose a button from the following three buttons on the UI in the second block from the top in FIG. 14: "HOW TO OPERATE", "SETTING COMPLETE", and "STOP". The user then presses a chosen button. When the user presses "HOW TO OPERATE", a description of the method of setting the disc tray 40 is displayed. When the user presses "STOP", the recording execution instruction is canceled, and the UI on the operation panel 6 returns to the home screen. When the user sets the disc tray 40 and presses "SETTING COMPLETE" (Yes in step S105), the controller 50 determines whether the reflector 41 disposed at the end portion of the disc tray 40 has been detected by the medium detector 59 (Step S106), and when detected (Yes in step S106), the disc tray 40 is transported and recording on the optical disc R is performed (step S108).

While recording on the optical disc R is performed, a notification of "PRINTING" is displayed on the UI of the operation panel 6 as illustrated in the third block from the top in FIG. 14. The disc tray 40 is ejected (step S109) and the light emitters 23 are switched off (step S110). When recording on the optical disc R is complete, a notification of "PRINT COMPLETE" and a confirmation button for confirming the print completion are displayed on the UI of the operation panel 6 as illustrated in the lowermost block in FIG. 14. When the user presses the check button, the UI on the operation panel 6 returns to the home screen.

As described above, the printer 1 includes the recording head 15 that is the recording section for performing recording on a medium, the support tray 18 that supports the medium on which recording was performed, and the light emitters 23 for illuminating a portion of the support tray 18 exposed to the outside of the apparatus body 2 with light. With this structure, the printer 1 enables the user to notice the portion relating to the operation by illuminating the portion of the support tray 18 externally visible to the user, that is, enables the user to readily notice the portion relating to the operation.

It should be noted that the "portion of the support tray 18 exposed to the outside of the apparatus body 2" includes not only a portion of the support tray 18 exposed to the outside of the surface of the apparatus body 2 but also a portion inside the surface of the apparatus body 2 visible to the user from the outside of the apparatus body 2 as in the embodiment. Accordingly, although the support tray 18 is not outside of the surface of the apparatus body as illustrated in FIG. 10, a portion of the first support surface 18d within the illumination area S corresponds to the portion of the support tray 18 exposed to the outside of the apparatus body 2.

In addition, the portion of the support tray 18 illuminated by the light emitters 23, that is, the portion relating to the operation that is not limited to the portion directly touched and operated by the user, may be any portion where the user performs an operation without direct touch, such as a portion on which a member such as the disc tray 40 according to the embodiment is mounted.

Figure 12:
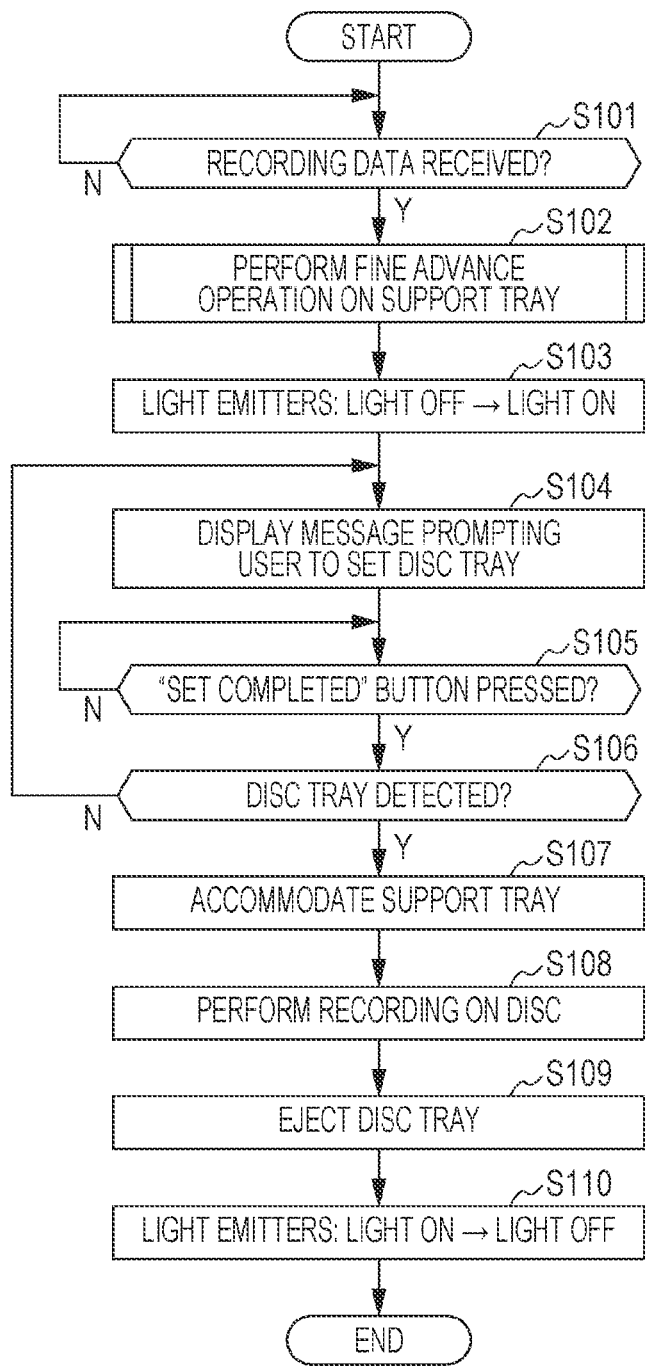
FIG. 12 is a flowchart illustrating processing for controlling the light emitters and the support tray.

In addition, the controller 50 that controls the light emitters 23 causes the light emitters 23 to emit light in response to switching to the standby mode to wait for a user operation (step S104 in FIG. 12). The light enables the user to notice that an operation is to be performed immediately, thereby enabling the user to smoothly perform a necessary operation.

It should be noted that the expression "causes the light emitters 23 to emit light in response to switching to the standby mode to wait for a user operation" means any one of causing the light emitters 23 to emit light before switching to the standby mode, causing the light emitters 23 to emit light simultaneously with switching to the standby mode, and causing the light emitters 23 to emit light after switching to the standby mode. In this embodiment, in response to the processing in step S104 in FIG. 12, switching to the standby mode is performed; accordingly, the light emitters 23 emit light simultaneously with switching to the standby mode or before switching to the standby mode.

In addition, in this embodiment, in response to the controller 50 receiving an instruction to execute recording on a medium, switching to the standby mode is performed and the light emitters 23 emit light. This processing enables the user to notice the portion relating the operation for recording on the medium, and thus recording on the medium can be smoothly started.

The controller 50 displays, in response to switching to the standby mode, a message on the operation panel 6 prompting the user to set a medium on the support tray 18 (step S104 in FIG. 12). The processing causes the light emitters 23 to emit light and the message to be displayed on the operation panel 6, enabling the user to further readily notice the operation to be performed.

The support tray 18 according to the embodiment receives power from the tray drive motor 60 (FIG. 5), which is a power supply, to change the position between the first position in which the support tray 18 is accommodated in the apparatus body 2 and the second position in which the support tray 18 is advanced maximally from the apparatus body 2. In the first position, the end of the second support surface 18e in the positive Y direction for supporting a medium in the support tray 18 is outside the illumination area S of the light emitters 23 (see FIG. 9). In response to switching to the standby mode, the controller 50 changes the position of the support tray 18 to the position in which the end of the second support surface 18e is within the illumination area S (step S102 in FIG. 12, and FIG. 10). The operation enables the support tray 18 to be illuminated appropriately, thus enabling the user to specifically notice the portion relating to the operation.

The controller 50 switches the support tray 18 to the first position in response to starting recording on a medium (step S107 in FIG. 12). More specifically, the support tray 18 in the first position is in the accommodated state, and the support tray 18 rattles less. The controller 50 switches the support tray 18 to the first position in response to starting recording on a medium, and thus the medium rattles less during recording, resulting in a good recording.

The support tray 18 supports the optical disc R via the disc tray 40 that is a medium support tray for supporting the optical disc R, which is an example of a medium. The structure enables a small medium or a medium that has a shape other than rectangular to be appropriately transported.

The controller 50 switches off the light emitters 23 in response to completing recording on the medium (step S110 in FIG. 12). This operation enables the user to notice that recording is finished.

In the above-described embodiment, the portion illuminated by the light emitters 23 is the portion of the support tray 18 exposed to the outside of the apparatus body 2; however, a portion of the sheet feed tray 5 exposed to the outside of the apparatus body 2 may be illuminated by the light emitters 23. More specifically, when the support tray 18 is in the first position as illustrated in FIG. 9, the front cover 4 of the sheet feed tray 5 is within the illumination area S. This structure enables the user to notice, for example, a paper-out condition by illuminating the front cover 4 after the support tray 18 is switched to the first position in a paper-out condition. Accordingly, the user can notice the portion relating to the operation.

The above-described structure for illuminating the support tray 18 by the light emitters 23 may be applied to image reading apparatuses for reading an image of a document. FIG. 15 illustrates a scanner 70 that is an example of the image reading apparatuses. In FIG. 15, components similar to those in the above-described structure are given the same reference numerals, and descriptions of the components are omitted in the following descriptions. The scanner 70 may include a controller 72 that corresponds to the above-described controller 50. A document S is fed into the apparatus similarly to the above-described disc tray 40, read by a reading section 71 while being transported in the positive Y direction, and discharged to the support tray 18. The reading section 71 may be, for example, a contact image sensor (CIS) module. The control processes to be performed for feeding, reading, and discharging the document S are similar to those in feeding, recording, and discharging the above-described disc tray 40. The scanner 70 enables the user to notice the portion relating to the operation by illuminating the portion of the support tray 18 externally visible to the user, that is, enables the user to readily notice the portion relating to the operation similarly to the printer 1.

It is to be understood that the present disclosure is not limited to the above-described embodiments, various modifications can be made within the scope of the following claims, and these modifications are included within the scope of the present disclosure.

What is claimed is:

1. A recording apparatus comprising:
an apparatus body;
a recording section configured to perform recording on a medium;
a support tray configured to support the medium on which recording was performed;
a light emitter configured to illuminate a portion of the support tray exposed to an outside of the apparatus body;
a controller configured to control the light emitter; and
a display section configured to display information, wherein
in response to switching to a standby mode to wait for a user operation, the controller causes the light emitter to emit light,
in response to the controller receiving an instruction to execute recording on the medium, switching to the standby mode is performed and the light emitter emits light, and
in response to switching to the standby mode, the controller causes the display section to display a message prompting a user to set the medium on the support tray.

2. The recording apparatus according to claim 1, wherein
by receiving power from a power supply, the support tray is configured to change a position between a first position in which the support tray is accommodated in the apparatus body and a second position in which the support tray is advanced from the apparatus body,
in the first position, an end of a support surface of the support tray for supporting the medium is outside an illumination area of the light emitter, and
in response to switching to the standby mode, the controller causes the support tray to change the position to a position in which the end of the support surface is within the illumination area.

3. The recording apparatus according to claim 1, wherein
in response to starting recording on the medium, the controller switches the support tray to the first position.

4. The recording apparatus according to claim 1, wherein the support tray supports the medium via a medium support tray for supporting the medium.

5. The recording apparatus according to claim 1, wherein in response to completing recording on the medium, the controller switches off the light emitter.

6. An image reading apparatus comprising:
an apparatus body;
a reading section configured to read a document;
a support tray configured to support the document which reading was performed;
a light emitter configured to illuminate a portion of the support tray exposed to an outside of the apparatus body;
a controller configured to control the light emitter; and
a display section configured to display information, wherein
in response to switching to a standby mode to wait for a user operation, the controller causes the light emitter to emit light,
in response to the controller receiving an instruction to execute recording on the medium, switching to the standby mode is performed and the light emitter emits light, and
in response to switching to the standby mode, the controller causes the display section to display a message prompting a user to set the medium on the support tray.

* * * * *